(12) United States Patent
Spagnolo et al.

(10) Patent No.: US 10,595,548 B2
(45) Date of Patent: Mar. 24, 2020

(54) METHOD FOR PROCESSING NON-PASTEURIZED GRAPE JUICES TO PREPARE SOFT WINES AND THE PRODUCT OBTAINED THEREBY

(76) Inventors: Isabella Spagnolo, Mareno di Piave (IT); Loris Casonato, Susegana (IT)

(*) Notice: Subject to any disclaimer, the term of this patent is extended or adjusted under 35 U.S.C. 154(b) by 896 days.

(21) Appl. No.: 13/979,628

(22) PCT Filed: Jan. 17, 2012

(86) PCT No.: PCT/IB2012/000054
§ 371 (c)(1),
(2), (4) Date: Jul. 12, 2013

(87) PCT Pub. No.: WO2012/098450
PCT Pub. Date: Jul. 26, 2012

(65) Prior Publication Data
US 2013/0287907 A1    Oct. 31, 2013

(30) Foreign Application Priority Data
Jan. 17, 2011    (IT) ............................... MI2011A0032

(51) Int. Cl.
| | | |
|---|---|---|
| A23L 2/50 | (2006.01) | |
| A23L 2/42 | (2006.01) | |
| A23L 2/74 | (2006.01) | |
| A23L 2/38 | (2006.01) | |
| A23L 2/04 | (2006.01) | |

(52) U.S. Cl.
CPC ..... *A23L 2/50* (2013.01); *A23L 2/04* (2013.01); *A23L 2/38* (2013.01); *A23L 2/42* (2013.01); *A23L 2/74* (2013.01)

(58) Field of Classification Search
CPC ... A23L 2/00; A23L 2/38; A23L 2/382; A23L 2/04; A23L 2/42; A23L 2/50; A23L 2/52; A23L 2/44
See application file for complete search history.

(56) References Cited

U.S. PATENT DOCUMENTS

| | | | |
|---|---|---|---|
| 2,833,657 A | 5/1958 | Copson | |
| 3,272,636 A * | 9/1966 | Fehr ........................... | A23L 3/01 426/234 |
| 3,979,524 A * | 9/1976 | Bayne ....................... | A23B 4/10 422/40 |
| 4,409,775 A * | 10/1983 | Brody ........................ | A23B 7/10 134/152 |
| 4,963,381 A | 10/1990 | Girard | |
| 5,266,337 A | 11/1993 | Baerwald | |
| 5,866,182 A | 2/1999 | Exner | |
| 5,962,054 A | 10/1999 | Kozempel | |
| 2006/0013927 A1 | 1/2006 | Geveke | |
| 2006/0246196 A1 * | 11/2006 | Lawson ................ | A23L 1/2367 426/548 |
| 2009/0297681 A1 | 12/2009 | Wilkes | |
| 2011/0311680 A1 * | 12/2011 | Takase ................ | A23L 1/22621 426/51 |

FOREIGN PATENT DOCUMENTS

| | | | | |
|---|---|---|---|---|
| EP | 1932438 A1 | 6/2008 | | |
| EP | 2062725 | * 5/2009 | ............... | B30B 9/22 |
| EP | 2241200 A1 | 10/2010 | | |
| SU | 1351569 A | 11/1987 | | |

OTHER PUBLICATIONS

EP2062725 Machine translation, May 27, 2009.*
Machine Translation of EP0165573, Warentenberg. Dec. 1985.*
Simply Recipes, Making Grape Juice (https://web.archive.org/web/20100709011518/http://www.simplyrecipes.com/recipes/making_grape_juice/) Sep. 2007.*
Italian Wine News, http://italianwinenews.blogspot.com/2009/05/prosecco-to-be-protected-by-new-docg.html 2009.*
Simranjit, Prosecco—The Italian "Champagne", (http://wi-not.biz/2010/10/prosecco-the-italian-%E2%80%9Cchampagne%E2%80%9D/) Oct. 8, 2010.*
Zironi et al, Sulphur Dioxide Management in Low Input Winemaking (https://www.infowine.conn/intranet/libretti/libretto7591-01-1.pdf) (Year: 2009).*
Theron, Different methods of cold maceration in red wine making (Year: 2008).*
Canal-Llauberes, Enzymes and wine quality (Section 4.4) (Year: 2010).*
International Search Report PCT/IB2012/000054 dated Jun. 6, 2012.
XP-002657398 Thomson Abstract of SU 1351569 dated Feb. 3, 1988.

* cited by examiner

*Primary Examiner* — Erik Kashnikow
*Assistant Examiner* — Lela S. Williams
(74) *Attorney, Agent, or Firm* — Hedman & Costigan, P.C.; James V. Costigan; Kathleen A. Costigan

(57) ABSTRACT

A method for processing non-pasteurized grape juices to prepare soft wines, characterized in that said method comprises a step of processing said grape juices by high frequency radio waves to microbically deactivate said grape juices in absence of any thermal effects.

3 Claims, No Drawings

METHOD FOR PROCESSING NON-PASTEURIZED GRAPE JUICES TO PREPARE SOFT WINES AND THE PRODUCT OBTAINED THEREBY

BACKGROUND OF THE INVENTION

The present invention relates to a method for processing non-pasteurized grape juices to prepare soft wines.

The invention also relates to a soft wine product prepared by the inventive method.

A soft wine is a non alcoholic wine which is at present considered as a valued beverage by all persons taking lunches or dinners or participating to parties who, as it is well known, must necessarily reduce to a minimum the use of alcohol in order to prevent all problems related to alcohol consume in driving a car during a return trip, both to prevent road accidents from occurring and not to be subjected to serious legal and police measures in a case of possible controls.

In particular, the inventive method allows to process any type of grape juice cocktail products, by performing a specifically designed radiofrequency (RF) treatment causing in said cocktails a microbic deactuation in absence of any thermal effects.

The existence of a non thermal effect related to the inventive method allows to sanitize grape juice products, without altering in any manners their nourishing properties.

In the inventive method, RF waves are used for stabilizing an analcoholic grape juice aromatized cocktail.

The high frequency radio wave processing step of the inventive method allows to sterilize an aromatized soft cocktail of wine products requiring said wine products to be bottled in aseptic bottles and environments.

A further feature of the inventive method is that the grape juice based products are processed by E242.

This non thermal treatment of the inventive method allows to sanitize the grape juice based products without altering their qualities and nourishing properties.

This is the first application of a E242 treatment to a grape juice aromatized cocktail, and, in this case, it is not necessary to perform a radiofrequency aseptic bottling.

A further feature of the inventive method consists of a stripping step which will be disclosed in a more detailed manner hereinafter.

This stripping step is performed by a gaseous washing, by food grade nitrogen, of the grape juice products, and, more specifically, said stripping step comprises a transferring of a gas (oxygen) dissolved in a liquid (wine must) from a liquid phase (the wine must) to a gaseous phase (air).

This must oxygen reduction is carried out before a sparkling or aromatizing step thereby greatly reducing dissolved oxygen while simultaneously reducing product oxidation effects, to greatly increase the product shelf-life time.

Another very important step of the inventive method consists of a pressing/grape stalk removing and decanting of the product, in absence of any contacts with oxygen.

With respect to the radiofrequency (RF) treatment, although this processing step has been hereinabove generally disclosed, it will be further disclosed in a more detailed manner hereinafter by way of an illustrative but not limitative example of one of several embodiments of using the inventive method, to make an analcoholic sparkling wine having the same taste and organoleptic characteristics as those of an alcoholic conventional "prosecco" wine, thereby allowing the inventive analcoholic prosecco wine to be freely consumed, even before driving a car, as a very good beverage in lunches, dinners, parties and so on.

The method according to the present invention has been specifically designed for making a novel sparkling soft prosecco wine, which is, from a taste standpoint, perfectly like a traditional prosecco.

Pasteurized grape juices and de-alcoholated wines are already known on the market.

A conventional industrial method for providing prior grape juices comprises a first step of mechanically picking up grapes and separating the grapes from other components such as grape stalk and shells.

Then the thus processed prior grape juices are added with a very high dose of sulphurous anhydride, also larger than 3000 mg per liter, to prevent any alcoholic fermentation from occurring.

The wine must is thereby hold, during the overall collection period, in a standby condition for subsequent processing operations which comprise, at first, a sulphur removal, performed in large vacuum operating systems, in which sulphurous anhydride is removed up to provide very low residual values thereof (0-20 mg/liter).

Then, the grape juice is further processed by yeasts and the wine must is immediately directed to the subsequent processing step, comprising a pasteurizing thereof.

As it is known, pasteurizing is a thermal treatment, usually performed at a temperature less than 100° C., and is designed for biologically stabilizing the product by a deactuation of microbic and enzymatic actions.

Such a pasteurizing allows to extend the life of products such as fruits and grape juices, that is extend their "shelf life", by several months.

In the pasteurizing treatment, no temperature sufficient to devitalize thermophyl microorganisms and spores is achieved.

Accordingly, the pasteurized juice is preferable under conditions adapted to limit a development of the above microorganisms.

In other words, pasteurizing is conventionally associated with other like preserving systems, such as the use of sulphurous anhydride or other preserving agents or a storing in a sterile environment.

The duration of the above pasteurizing treatment varies depending on the method type, also depending on the nature of juices and their contamination degree.

It is possible to carry out high speed treatments at higher temperature or longer treatments at lower temperatures.

The pasteurizing of grape juices and must has greatly negative organoleptic consequences such as the Maillard's reaction, also known as a non enzymatic darkening effect, which occurs as the grape must, in which sugars and aminoacids are present, is subjected to a thermal treatment.

The Maillard's reaction causes, as it is well known, a formation of oxymethylfurfural (OMF) greatly altering aroma, taste and color of the wine must.

Then, the product is stored in an aseptic environment: the must, from which fermentative agents have been removed, is then prevented from achieving an alcoholic fermentation by at first preserving it in sterilized tanks (sterilized by steam or chemical substances).

The exposition to air and low levels of sulphurous anhydride, however, negatively affects the wine must organoleptic quality.

Finally, juices are recovered from the storing tanks and packaged in an aseptic environment, in which condition they are sent to selling.

Conventional grape juice based industrial products do not preserve their original organoleptic high quality, since the treatments the juices are subjected to cause a modification, such as a disappearing, removal or deterioration of the starting must perfume/taste, and, in a lot of cases, also alter the must color because of the above mentioned Maillard's reaction and oxidation of must phenolic components.

Thus, to make satisfactory grape juices it is absolutely necessary to use, depending on the raw material type, its ripening degree and so on, aromas to restitute some original organoleptic properties starting product.

With respect to de-alcoholated wines, CE regulation No. 606/2009 has introduced, as an admitted oenological practice, a partial dealcoholation of wines by means of physical methods.

A full elimination of alcohol is thereby not allowed.

The above dealcoholation methods are broadly used in several food and chemical industrial areas, such as in beer dealcoholation, and in a lot of other agroalimentary sectors.

The reduction of the alcoholic titre of wines may be achieved by a corresponding reduction of the sugar contents of must or a partial dealcoholation of wine.

The dealcoholation method is legally allowed from some years in several Countries, but not in the European Union, and is carried out by systems based on the so-called membrane techniques, by which the reduction of the wine alcohol contents is achieved by removing ethyl alcohol or reducing the sugar contents, said sugar contents reducing being performed by a combination of ultrafiltering and nanofiltering steps, in which a portion of an ultrafiltered must is concentrated by an osmotic nanofiltering membrane: the retentate, rich in sugars, is separated from must, whereas the permeate, rich in acids, is reintegrated to the must, which, in this manner, will have reduced alcoholic contents.

This method, proposed by Swiss research workers, is comparatively expensive and complex from a technical standpoint, and provides organoleptic results which are at present still object of studies.

With respect to the must dealcoholizing methods, among the physical methods directly applied on must to cause alcohol to be evaporated at low temperature, the so-called "Spinning Cone Column", already applied to beer dehalcoholizing, is herein mentioned, which spinning cone column comprises a vertical stainless steel cylinder in which an inert gas having a stripping effect, removes, under vacuum, a volatile compound stream or current from liquid.

The above spinning cone column method is a very efficient method, and moreover has a good energetic efficiency.

The disadvantage of this method is the heating of the must mass, necessary for providing dealcoholizing, since the stripping step is performed at 38° C., with a consequent organoleptic decay of must.

By means of product fractionation processes, it is possible to remove alcohol from wines by using osmotic membranes in combination with a permeate evaporation.

One of these techniques provides to use a combination of a reverse osmosis and distillation, (which is a technically feasible and inexpensive method), in which a hydrophilic osmotic membrane is used.

In this method, must is subjected to a reverse osmosis to produce a permeate which is dealcoholated by distillation and then being reintegrated to the reverse osmosis retentate.

The above is a subtractive method involving a negligible decrease of the product volume and a possible reduction or decay of volatile compounds characterizing the main must olfactory properties.

Yet another method is that of processing must by hydrophobic membranes which are interposed between the must and an extracting solution or water, to provide a gas film (a gaseous membrane) therethrough the more volatile compounds will pass, the most representative of which is ethanol.

This technology, called "a contactor method", does not perform any must fractionation but a non negligible reduction of the must volume and volatile compounds.

The reverse osmosis method, in combination with distillation, has been already used in several Countries with the exception of the European Union.

A partial wine dealcoholation is broadly diffused in some viticultural areas such as California; however, the operating steps generally pertain to conventional methods affected by several critical problems, even from a qualitative standpoint.

As exposed on Jun. 26, 2010 by the vice-chairman of OIV ("Organisation Internationale de la Vigne et du Vin"), Peter Hayes, during an OIV general meeting, data on the sensorial effect of dealcoholation show that great differences exist with respect to the starting product thereby suggesting a possible refining of this technology to further reduce the alcohol contents and produce less adverse effects on the product sensory properties.

SUMMARY OF THE INVENTION

Accordingly, the aim of the present invention is to provide a product which is substantially different from conventional grape juices and soft or dealcoholated wines, both with respect to their making methods and organoleptic characteristics.

Within the scope of the above aim, a main object of the invention is to provide such a sparkling soft or analcoholic beverage, based on viticultural products, of a non-pasteurized type, leaving all natural components of grapes and organoleptic characteristics thereof unaltered.

Another object of the invention is to provide such a product which, with respect to conventionally pasteurized grape juices, maintains the grape chemical components fully unaltered.

Yet another object of the invention is to provide such a product which, with respect to conventional pasteurized juices, provides the novel juices with a larger amount of aromas and freshness, which would be greatly reduced by a pasteurizing method, and without leaving any "boiled/cooked" taste, which is typical of prior grape juices.

Another object of the present invention is to provide such a grape juice product which, with respect to conventional pasteurized juices, has a more acidulous taste, and is easily preserved, without any objectable taste of being cooked or boiled.

Yet another object of the present invention is to provide such a product which, with respect to conventional pasteurized juices, is adapted to maintain in time a good color, without tending to progressively present brown tones, and darking traces causing a deep yellow color like that generated by a pasteurization method.

Yet another object of the present invention is to provide such a wine product which, with respect to conventional dealcoholated or soft wines, does not contain alcohol traces, and has a small contents of typical components of the starting must, such as vitamins and antioxidating substances.

Yet another object of the present invention is to provide such a product which, with respect to conventional dealcoholated wines, is adapted to hold the bouquet and flavor typical of the starting grape variety unaltered, as well as its starting organoleptic qualities.

Yet another object of the invention is to provide such a product which, with respect to conventional dealcoholated or soft wines, is adapted to hold unaltered the grape color as that of grapes only just squeezed, without forming deep yellow and brown reflex colors, as well as browning traces, indicative of an excessive oxygenation.

According to one aspect of the present invention, the above mentioned aim and objects, as well as yet other objects, which will become more apparent hereinafter, are achieved by a non pasteurized analcoholic or soft sparkling beverage based on grapes.

DESCRIPTION OF THE PREFERRED EMBODIMENT

Further according to the present invention, the above mentioned aims and objects, as well as yet other objects which will become more apparent hereinafter, are achieved by a method for processing non pasteurized grape juices to prepare non pasteurized soft wines.

According to a preferred embodiment thereof, the invention comprises a starting operating step of picking up, preferably manually, grapes.

Said grapes are preferably early harvested to hold a set acid contents and reduce protein wine contents.

The grapes are harvested in cases, and possibly at a low temperature, and being immediately transported to a pressing or squeezing stage.

Then, a first sulphurous anhydride adding step and cooling of the mechanically harvested squeezed grapes is performed, so as to continuously refrigerate, without stressing, grapes, while eliminating oxygen dissolved in the grape must, which is directly collected in the vineyard immediately after the mechanized harvesting.

This technique consists of a must refrigerating method using $CO_2$ connected to a basin for transporting grapes.

The grape harvesting machine discharges the harvested grapes into said basin where the grape bunches and must are separated by gravity through a separating grid.

The must is picked up through a picking up or suction pump and sent to a refrigerator.

The refrigeration is carried out by injecting liquid $CO_2$.

After having achieved the target temperature, the cooled or refrigerated must is reconveyed to the basin in order to refrigerate the grape bunches and must contained therein.

This must recirculation is continuously performed so as to cause the overall must in said basin to achieve said target temperature, the process being adjusted through a touch screen and PLC assembly.

This technique or method allows to reduce the squeezed or pressed grape temperature to a target value, of preferably 2-3° C.

A third step of the inventive method provides to remove the manually or mechanically harvested grapes stalks, refrigerate the pressed or squeezed-product from which stalks have been removed and saturate it by carbon anhydride, preferably through a per se known "Boreal" apparatus.

In the method, grapes are sent to a cellar where grape stalks are removed; then the thus processed grapes are cooled to about 5° C. and then saturated.

This technique requires a quick and homogeneous cooling of the pressed stalkless freed product, which cannot be easily achieved by a conventional mechanical cooling system.

In fact, conventional refrigerating bands do not allow to achieve a sufficiently homogeneous temperature.

The use of an exchanger, while allowing to provide better results, subjects grapes to an undesirable mistreatment.

This operation, with respect to a conventional must refrigerating after squeezing method, prevents yeasts from generating before the must decanting and accordingly reduces any fermentation and aroma loss risks.

This further allows to perform a quick and efficient cleaning of the must up to a target turbidity level thereof.

Moreover, excess $CO_2$ will saturate the pressed or squeezed product.

The above mentioned Boreal apparatus is adapted to continuously and automatically operate so as to process up to 30 ton/h of squeezed grapes with a capability up to 400,000 frigories/h with a minimum temperature achieved by the outlet pressed product of 5° C.

Said Boreal apparatus is installed immediately downstream of the squeezing-stalk removing assembly and, after having refrigerated the product, it conveys it to the following processing stage (the squeezing or pressing one).

The refrigerating fluid comprises liquid $CO_2$, the specific consume of which is of 11 Kg $CO_2$ liq/ton pressed or squeezed product ° C.

The Boreal apparatus is a single-tube exchanger operating to continuously refrigerate or cool the squeezed product by liquid carbon anhydride to a temperature of 4-5° C., and being arranged between the squeezing/stalk removing assembly and the pressing vat.

Refrigeration is achieved by a direct contact between the squeezed product and liquid $CO_2$, which is supplied to the exchanger through suitable injection systems.

In said exchanger, liquid $CO_2$ yields its frigories and passes to a vapor status, while driving the mass and providing a quick and homogeneous refrigerating process.

Gaseous $CO_2$ refrigerates, while simultaneously saturating, the pressed product to prevent oxidating and browning phenomena during this processing steps from occurring.

Excess $CO_2$ is separated from the pressed product and outside discharged.

The exchanger is used with a variable inner pressure, the value of which compensates for the load losses to allow the pressed product to be transferred to following processing stages without using transfer pumps.

The system further comprises a refrigerating control and managing assembly which operates in a full automatic manner and is interfaced, by a video and keyboard equipment, to the operator and other machines in the cellar, such as the pressing/stalk removing assembly.

A fourth step of the inventive method comprises the grape pressing or squeezing operation.

The collected product, refrigerated to 5° C. and saturated, is immediately pressed by a pneumatic press, controlled by a French pressing protocol with a maximum operation pressure of 1 atm.

The obtained must is enzymated by 5 gr/hl pectolitic enzymes, loaded into basins preliminarily sterilized by sterilizing steam or peracetic substances, which are a powerful antiseptic and antibacterial agents, active at a concentration even less than 1%, and being held at a temperature of about 5° C.

At the starting of the loading operation, a dry ice material is distributed to saturate, during the pouring off or decantation, the surface of the liquid in the temperature adjusted basin.

A fifth step of the inventive method comprises a floating operation, that is a system for separating solid-liquid materials by facilitating and accelerating the surface raising movement of solid materials present in the medium by very small air bubbles, supplied to the fluid to adhere to the extraneous substances present therein, while reducing their apparent density and entraining them to the surface from which they are removed by a continuous cleaning system or by pouring off to another basin the underlying clear material.

The microbubbles are generated by saturating by a pressurized sterile and food grade nitrogen a rate of the food recirculated from the rear portion of the system.

This flow is re-introduced at an atmospheric pressure at the head of the system, where a bubble cloud is formed.

The above disclosed floating technique has been used in the oenological or wine making field from the end of the 80's, with the main object of making the must clear, thereby providing stable and organoleptic satisfactory products, accelerating the grape processing, owing to the rapid separation of waste material from must with a high flowrate per hour, and to reduce polyphenols and substances susceptible to cause instability phenomena in must.

To achieve a proper operation of the floating system, it is necessary to use some floating aids, at operating doses of about 20 grams/hl, and usually comprising bentonite and jelly, the latter being used at a dose substantially half with respect to that of bentonite.

Preferably, pectolitic enzymes are moreover added.

Further preferably, the grape juice is caused to perform five passages through the processing cell before exiting the system.

The clear juice yield is comparatively high, of about 95%, whereas the waste material is of about 5%.

It is also possible to carry out a batch floating method, with the same operating rules, whereas the making process is a discontinuous one.

The enzymated must exiting the press is loaded into a sterile basin and remains herein in a standby condition for two hours under the pectolitic enzyme action.

Then, a nitrogen floating is performed (bentonite 20 gr/hl), vegetable jelly (10 gr/hl) and, after about 10-12 hours, the clear material is decanted or poured off (with a NTU as near as possible to 0) to another basin, which have been presterilized and saturated by carbon anhydride.

Yet another operating step of the inventive method comprises a tangential microfiltering.

In this processing step, the floated must is immediately filtered to a sterile condition by a tangential filter.

Thus, the fermentation risk caused by yeasts and bacteria is reduced substantially to zero, in cooperation with a preserving temperature of about 5° C.

Then, the thus processed must is subjected to an accurate chemical analysis: alcohol, sugar, volatile and total acidity, total free and molecular sulphurous anhydride, pH, potassium, tartaric acid, calcium, copper, lead, iron, lactic and malic acids, total polyphenols, net extracts and total proteic acetaldehyde stability, to perform all the required stability and preserving evaluations.

The product to be filtered is sent to the filter through an independent supply pump after passing through a pre-filter assembly.

The filtering modules are supplied by a recirculating pump so designed as to prevent the product being processed from being heated.

Only a portion of the retentate is recirculated to the supplying basin, and no recirculation through an intermediate tank is used.

The membrane construction and membrane supports allows to perform a counter-current washing operation in turn allowing to carry out an automatized mechanical regenerating without interrupting the making cycle to provide a permeate more constant hour flowrate.

The several filtering properties may be briefly indicated as follows:
  a possibility of performing fully automatic working cycles which do not require the presence of an operator;
  the preserving and holding of all the must typical characteristics, including its substances important to provide the desired must stability, as mannoproteins and protective colloids;
  the preparing of musts in a ready for bottling condition: filtering index <10° S;
  the achieving of musts having a turbidity corresponding to 0.00 NTU, with starting turbidity values varying from 25 to 1000;
  an absolute absence of any types of filtering aiding agents;
  a possibility of performing washing operation at very high temperatures (70-80° C. 158-176° F.), to allow the membranes to be easily and efficiently regenerated;
  a life of the filtering elements up to five times greater than the average life of organic material membranes.

The above tangential filters are made by hollow fiber filtering modules of the last generation, allowing to achieve optimum results both from a quantitative and qualitative aspects, while allowing to further achieve a great saving in managing the must filtering operations.

The above technique provides to filter must by causing it to pass with a flow parallel to the membrane.

Only a part of the product is conveyed to the filtering element, and the retentate material is continuously removed from the must passage or path and concentrated, thereby greatly reducing a possible membrane blockage.

Moreover, the membrane has an anisotropic construction, that is an asymmetric one, with a very smooth surface and a very short capillary path.

The matrix pores have a conic contour thereby limiting the possibility of inner blockages.

Yet another following step of the method comprises a processing or treatment by bentonite.

Based on analysis data, the sterile must is subjected to a deproteinizating treatment in order to provide a proteic stability thereof.

Thus, the method according to the present invention further comprises a must processing step by means of polyvinylpolypirrolidone (PVPP).

An addition of PVPP at a dose of 8 gr/hl is preferable owing to its high specificity and phenolic substance absorption capabilities, mainly with respect to tannic and greatly oxidating substances.

Owing to its high operating specificity, this addition prevents any oxidation effect with respect to phenolic substances, thereby the product will have a lighter weight and a good taste, while enhancing its flower characteristics.

The must, as added with bentonite and PVPP, is filtered and, in a clear condition, being sent to a sterile basin, while preferably adding thereto antioxidating tannins.

Yet another following step of the method is a stripping operating step.

The air contacting liquids contain dissolved oxygen which is responsible of development of an aerobic microflora and vitamin and liquid oxidation.

The deoxygenation will reduce the amount of oxygen contacting the food products up to a value less than 0.5 ppm.

Said deoxygenation may be performed either in line or in a storing condition.

The in-line deoxygenation is usually carried out before storing the product in tanks, or immediately before its bottling, through an injector assembly arranged after the decanting or pouring off pump on the vat outlet pipe, diffusing gas in the form of gas microbubbles.

The injected gas amount is from 0.5 to 1 l/l product, to eliminate or remove 80-95% of dissolved oxygen.

The deoxygenation in a storing condition is carried out by using a stirring lance inserted into the bottom portion of the vat to carry out a liquid deoxygenation and re-raising by forming nitrogen or argon microbubbles, or by an ISO-MIX apparatus supplied by a supplying pump including a recirculating system designed for mixing and deoxygenating the liquid held in a liquid tank.

During the storing operation it is necessary to prevent any contacts between the must and air oxygen.

Such a contact would cause a series of quality degrading phenomena preventing the product from being used.

After having filled-in the tanks, the air remaining at the head portion thereof is replaced by an inert gas under a very slight overpressure.

The protecting system is based on the venting adjustment of the alimentary liquid containing tanks.

The advantages of such a system comprise an automatic operation, a safe result and a very great use simplicity.

The method is carried out by a fixed distributing and adjusting system comprising a primary reducing unit, a very low pressure reducing unit, a double-action safety valve, pressure control valves, further related valves and fittings.

The filling-in and tapping off flow-rates are so designed as to meet all requirements of large and small wine making organizations.

The apparatus is assembled on a pre-mounted frame which may be easily fixed to a wall.

In the oenological field a movable system for rendering a tank inert is also used, which, through a gas inlet device, arranged at the top portion of the tank, removes air present in the head space by means of a "piston effect".

The main technique consists of injecting nitrogen or argon directly into the handling line before storing.

The method according to the present invention further comprises a must gasifying operation.

In this operating step, the clear protein stable must, processed by PVPP and deoxygenated, is loaded into an autoclave for performing the gasifying operation by an alimentary carbonic anhydride or a natural fermentation of other lots of "prosecco" wine.

The gasifying is carried out at 2° C. with a porous candle to achieve, within about a day, a pressure of 4.6 atmospheres.

After the gasifying operation, the must is left at rest for 15 days, in order to achieve tartaric stability aided by the cremotartar.

At the end of gasifying step, the must is analyzed with respect to all the pre-bottling parameters, to evaluate the achievement of the proteic tartaric stability and alcoholic contents.

In particular, the following parameters are tested:
1—volume alcohol titre
2—reducing sugar contents
3—total volume alcohol titre
4—total acidity in tartaric acid
5—volatile acidity in acetic acid
6—total sulphurous anhydride, either free and molecular
7—pH
8—potassium
9—tartaric acid
10—max potassium according to usseglio Tomasset
11—calcium
12—copper
13—lead
14—iron
15—I+ lactic acid
16—I− malic acid
17—total polyfenols
18—total and net dry extract
19—proteic stability
20—acetaldehyde This operating step is carried out by adding deionized water up to a sugar value of 110 gr/l and identical natural aromas.

By meeting the limitations of the wine making field, optionally and depending on the production year, the following parameters are further measured and adjusted:
citric and lactic malic acidity;
addition of colorless antioxidating tannins at a dose of 15 gr/hl;
an addition of sulfurous anhydride up to a free sulfurous anhydride titre of 45 mg/l;
L ascorbic acid up to the law limit;
Arabic gum
methatartaric Then, the product is finally bottled.

This bottling may be carried out in a sterile environment and with a sterile product, under isobaric condition, in sparkling wine bottles having a mushroom cork plug and a plug detent cage with a sparkling wine dedicated packaging.

The bottling may also be performed by dimethyldicarbonate, in a sterile bottle and with a sterile product but in a non sterile environment.

E242 dimethyldicarbonate (DMDC) is the most used food additive: it is a colorless liquid, with an ester odor at a low concentration and slightly pungent at a high concentration.

DMDC water hydrolysis leads to a formation of methanol and carbon anhydride.

In particular, the maximum admitted dose of 250 mg/l DMDC leads to a formation of 126 mg methanol and 163 mg carbon anhydride.

DMDC provides a broad spectrum antimicrobic action against yeast, bacteria and molds, which is due to the action of this substance per se before hydrolysis.

In particular, it is submitted that the above action is directed against set proteins, in particular those including an imidazolic group.

The product hydrolysis is carried out with an hydrolysis time varying from 1 h (30° C.) to 7.5 h (4° C.), in which the vessels containing the DMDC added liquid cannot be opened or tasted.

DMDC is conventionally used in food and oenological fields as a microbiologic stabilizer agent and does not have any contraindications for the consumers.

The method according to the present invention further provides to process by radiofrequency or RF the must, which RF process constitutes one of the main features of the invention.

During the RF heating, heat is generated in the product owing to a molecular friction caused by the oscillations of molecules moving to align with the applied alternating electric field.

The thus achieved heating is of a volumetric type: the food product is instantaneously heated on each portion thereof.

Moreover, the increase of the product temperature depends on the friction number occurring in the space and, accordingly, linearly depends on the applied voltages and on the RF exposing time.

In Italy, the sole allowed frequency is 27.12 MHz, corresponding to a wavelength of 11.11 m.

The performance at a radiofrequency will depend in a large degree on the dielectric properties of the food product being heated, which in turn are affected by the product chemical-physical characteristics, such as viscosity, moisture contents, physical and chemical status, on the type of interactions occurring between the several food product components, and on outer parameters, such as the applied frequency and temperature.

In the method according to the present invention the lethal effect is exploited, of a non-thermal type, on pathogen agents allowing to reduce the microbic load on fresh food products without damaging the latter and without any loss of nourishing substances.

The operating mechanisms comprise an interference with the citoplasmatic membrane functionality and a consequent breakage thereof, in addition to cellular lyses due to an absorbing of the electromagnetic waves.

To provide a sufficient microbic reduction at sub-lethal temperatures, it is necessary to extend the processing time or increase the applied electric field strength (30 KV/cm).

Thus, a repeated application of short duration treatments with a high voltage allows to enhance the antimicrobic effect.

In any case, the radiofrequency application has a satisfactory decontaminating effect on liquid products, due to the minimum resistance opposed by the latter to heating, without the need of subjecting them to high temperatures which would undesirably destroy aromas and natural benefic properties.

According to an exemplary practical embodiment, the method according to the present invention comprises the following operating steps.

At first, a first mono-variety grape selection step is carried out, for example of GLERA grapes, which are cultivated according cultivation protocols applied to the "Prosecco DOC" zone.

The above grapes are particularly suitable for producing fruity slightly acid or acidulous juices, owing to at least two characteristics: the thermal jumps, between day and night, typical of an alpine-mediterranean transition environment, and the hydric stress of the plant cultivated in gravelly zones, such as glera, grave.

Up to now, no soft wine maker has disclosed or suggested the idea of using a single-variety grape juice.

Like for the wine, which in the past was only "white" or "red", the grape juices available on the market are only white and red, since they are made from a combination of different grapes, without distinguishing the different cultivars, territorial origin, ripening levels.

A basic aspect of the present invention consists in choosing a simple and only one cultivar, that is "glera", very suitable to make a soft, perfumed and fruited light or soft sprinkling wine, and which is likewise suitable to produce an analcoholic cocktail having those same excellence characteristics.

A second step of the method comprises an early grape harvesting to hold a set acid contents and reduce a protein wine contents, thereby minimizing any risks of an alcoholic fermentation starting.

A third step of the method according to the present invention comprises a step of pressing, grape stalk removing and decanting of wine in absence of oxygen.

The pressing or squeezing operations are carried out in an environment saturated by carbon anhydride to prevent oxygen from entering with consequent aromatic component oxidations.

The decanting operation provides a saturation by carbon anhydride of the decanting basins.

In fact, since $CO_2$ has a weight greater than that of air, it is stratified in the bottom portions of the basins thereby operating as a plug and preventing air from contacting the must, which would cause a solubilization of oxygen.

A fourth step of the method according to the present invention comprises floating the wine must after pressing.

As above mentioned, said floating operation is a treatment specifically designed for clarifying the wine must for removing suspended solid substances.

This floating step is carried out by dissolving pressurized food quality nitrogen in the main must which, by raising as small nitrogen bubbles, entrains therewith suspended particles and resting therewith on the liquid surface in the form of a foam, which is then removed from the must top free surface by using a removal knife, the so-called skimmer, according to a continuous method.

As an alternative, it is possible to take the separated clearly liquid from a bottom valve of the basin by performing a discontinuous floating and skimming method.

A fifth step of the method according to the present invention comprises processing wine by bentonite, that is a natural clay, to make the wine must stable to proteins.

A sixth step of the inventive method comprises processing wine by a polyvinylpolypyrrolidone containing product (PVPP) to absorb any phenolic substances, in particular the tannin and most oxidating substances, thereby preventing any oxidation effect to the phenolic substances.

Owing to its high action specificity, PVPP prevents any oxidation effects related to phenolic substances, thereby providing a lighter and softer product while enhancing its flower characteristics.

The above disclosed step represent a first and novel application of PVPP on wine must to provide a grape juice substance aromatized cocktail.

A seventh step of the inventive method comprises tangentially filtering to provide a sterile product from the prefloated material.

The filtering of the must is carried out by causing it to pass with a must flow parallel to the membranes.

Through the filtering element only the clear and sterile must is conveyed and retained material is continuously removed by the passing through concentrated must flow, thereby greatly reducing any possible blockage of the membrane.

Yet a further step of the inventive method provides to preserve the product in a sterile environment.

The clear and sterile must is loaded in loading basins sterilized by using sterilizing vapor or peracetic substances and being preserved or stored under a controlled temperature up to its sparkling time.

A ninth step of the method according to the present invention comprises a stripping of the product carried out by a gaseous washing using food grade nitrogen.

Said stripping consists of transferring a dissolved gas, such as oxygen, into a liquid, such as must, from the liquid phase (must) to the gaseous phase, air.

This reduction of must oxygen before the must sparkling allows to greatly reduce dissolved oxygen, while reducing the product oxidation effects, and thereby extending the product shelf-life.

A further step of the inventive method comprises a gasifying step, that is an addition of carbon anhydride, $CO_2$.

In this step the must, introduced into an autoclave, a pressure tight vessel, is made sparkling by a slow introduction of carbon anhydride through a porous candle.

Yet another step of the method according to the present invention comprises a RF treatment, to provide a microbic deactuation, in absence of any thermal effect, by high frequency radiowaves.

The existence of a non thermal effect related to this technology allows to sanitize the food products without altering their quality and nourishing properties.

This technique is applied only in combination with a bottling of the grape analcoholic cocktail in an aseptic environment and by using sterile bottles.

This is the first novel application of a radiofrequency for sterilizing a grape juices analcoholic aromatized cocktail, providing this product to be bottled in aseptic or sterile bottles and environments.

An alternative step of the method comprises a processing by E242.

The existence of a non-thermal effect related to this technology allows to sanitize the subject food products without altering their quality and nourishing properties.

This is the first application of E242 to a grape juice aromatize cocktail product. In this case, it is not necessary to perform the RF aseptic bottling step.

Yet another operating step of the inventive method provides to isobarically bottle the sterile product, upon sterilizing bottles and plugs.

A final operating step of the inventive method comprises an enhancing, through a sparkling wine packaging use, mushroom plug, restraining cage, and elegant bottle.

In this connection it should be pointed out that bottled sparkling grape juices are available, but none of the latter has used a "champagne" type packaging therefor.

It has been found that the invention fully achieves the intended aim and objects.

In fact, the invention has provided a method for making a sparkling analcoholic cocktail starting from a non pasteurized single grape variety, which leaves all the natural components of grape and its organoleptic characteristics unaltered.

The invention claimed is:

1. A method of preparing a sparkling non-pasteurized and non-alcoholic prosecco wine, without any objectionable taste of being cooked or boiled comprising the following steps:

harvesting of mono-variety Glera grapes cultivated according to Prosecco DOC zone cultivation protocols to obtain a set acid content and a reduced protein content;

removing stalks from said grapes and squeezing said grapes to form a grape must by means of a squeezing-stalk removing assembly and adding sulphurous anhydride to said grape must;

feeding said grape must, and without heating said grape must after stalk removal and squeezing, to a cooling apparatus, arranged immediately downstream of said squeezing-stalk removing assembly, and cooling with said cooling apparatus said grape must to a minimum temperature of 5° C. by injecting liquid carbon dioxide into said grape must during a recirculation pumping of said grape must and saturating said grape must with carbon dioxide;

pressing said grape must to obtain grape juice, and decanting said grape juice in an absence of oxygen to form a non-alcoholic wine must;

adding enzymes to said non-alcoholic wine must;

floating said non-alcoholic wine must after pressing to provide a floated material;

processing said non-alcoholic wine must by passing said non-alcoholic wine must through bentonite, to make said non-alcoholic wine must stable to proteins;

contacting said non-alcoholic wine must with a polyvinylpyrrolidone product to absorb phenolic tannin and oxidizing substances, in order to obtain a phenolic tannin free non-alcoholic must;

tangentially filtering said phenolic tannin free sterile non-alcoholic must to obtain a filtered phenolic tannin free non-alcoholic must;

preserving said filtered phenolic tannin free sterile non-alcoholic must in a sterile environment to form a preserved sterile non-alcoholic must;

stripping said preserved sterile non-alcoholic must in a sterile environment to remove dissolved oxygen to form a stripped sterile non-alcoholic must;

gasifying said stripped sterile non-alcoholic must by adding a $CO_2$ gas, while introducing said stripped sterile non-alcoholic must into an autoclave to form said sparkling non-pasteurized and non-alcoholic prosecco wine;

bottling said sparkling non-pasteurized and non-alcoholic prosecco wine in aseptic bottles and in an aseptic environment;

contacting said non-pasteurized and non-alcoholic prosecco wine with high frequency radio waves to deactivate microbes without any thermal effect after having bottled said non-pasteurized and non-alcoholic prosecco wine in said aseptic environment in said aseptic bottles.

2. A method according to claim 1, wherein said bottling is carried out with sparkling champagne wine bottles having a mushroom cork plug and a plug detent cage.

3. A method according to claim 1, wherein said high frequency radio waves have a frequency of 27.12 MHz corresponding to a wavelength of 11.11 m.

* * * * *